United States Patent Office

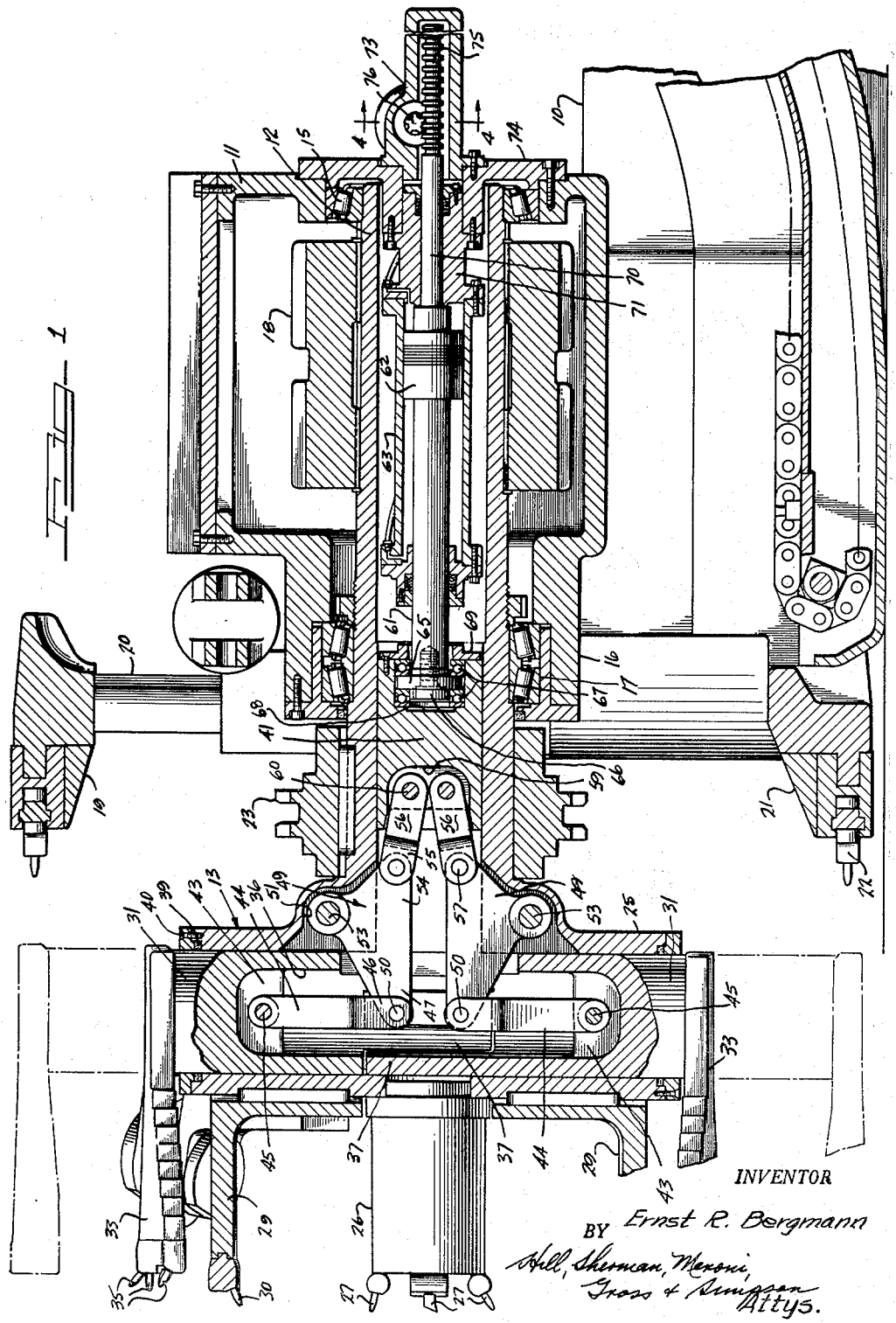

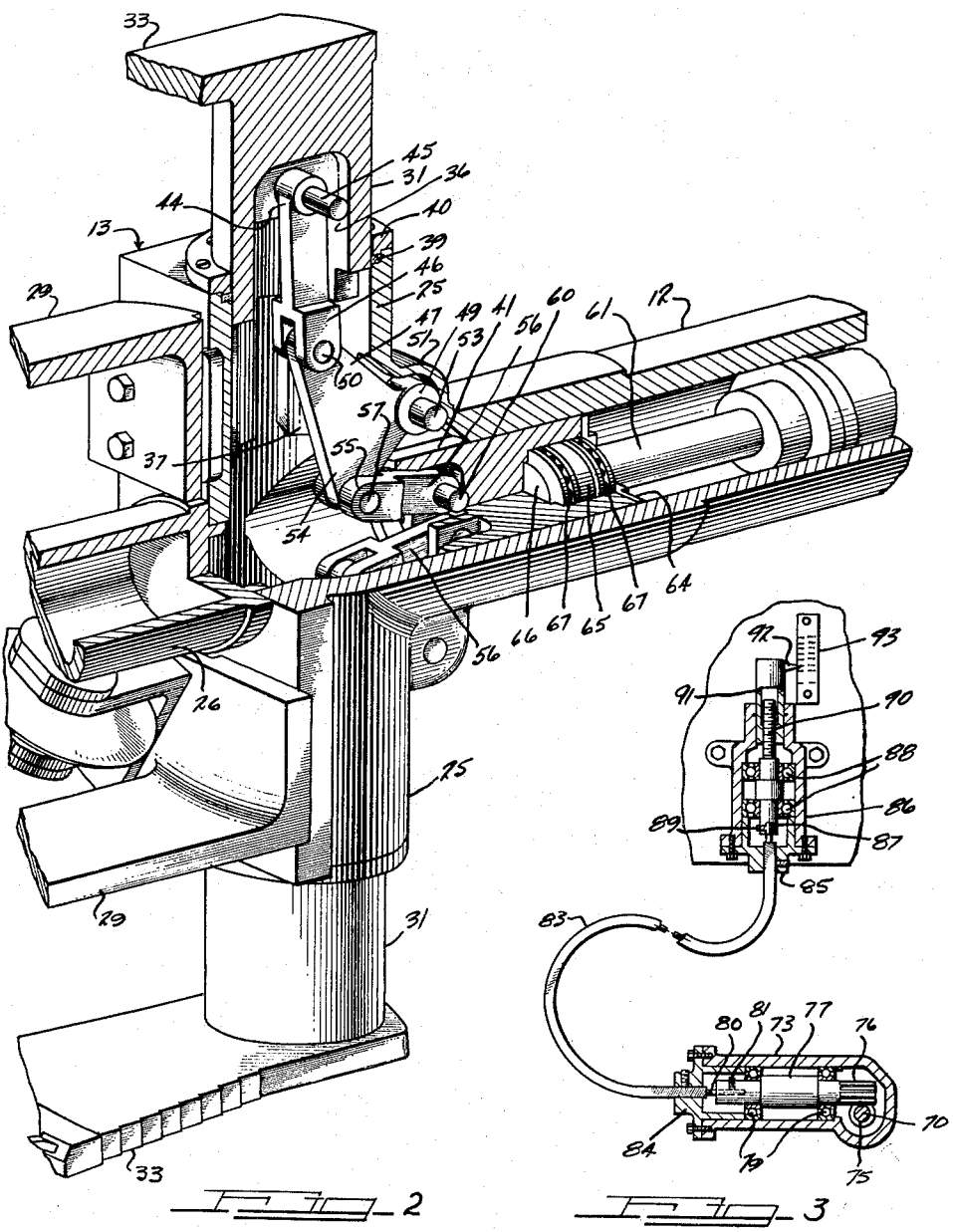

3,109,635
Patented Nov. 5, 1963

3,109,635
ADJUSTABLE BORING HEAD FOR CONTINUOUS MINING MACHINE
Ernst R. Bergmann, Evergreen Park, Ill., assignor to Goodman Manufacturing Company, Chicago, Ill., a corporation of Illinois
Filed Nov. 16, 1960, Ser. No. 69,667
7 Claims. (Cl. 262—26)

This invention relates to improvements in continuous mining machines of the boring type and more particularly relates to an improved form of boring head for such machines.

A principal object of the invention is to provide an improved boring head for continuous mining machines, in which the boring head is radially adjusted and held in selected positions of radial adjustment by the adjusting means therefor.

A further object of the invention is to provide a radially adjustable boring head for continuous mining machines of the boring type having an increased range of adjustment in which the adjusting means for the boring head holds the boring head in its selected positions of adjustment.

A still further object of the invention is to provide an improved form of radially adjustable boring head in which adjustment is attained by a power operated slide movable along the support shaft for the boring head, and a linkage and leverage arrangement operated by the slide so arranged that the cutting forces on the adjustable arms of the boring head will be taken endwise on the slide in all positions of adjustment of the adjustable arms.

These and other objects of the invention will appear from time to time as the following specification proceeds and with reference to the accompanying drawings wherein:

FIGURE 1 is a fragmentary longitudinal sectional view taken through one of the boring heads and support means therefor, of a continuous mining machine constructed in accordance with the invention;

FIGURE 2 is a perspective view of the boring head shown in FIGURE 1 showing the boring arms in extended positions and showing one of the boring arms and the support and drive shaft therefor in longitudinal section; and FIGURE 3 is a fragmentary detail transverse sectional view illustrating the indicating means for indicating the cutting diameter of the boring head.

In FIGURE 1 of the drawings, I have shown a portion of the forward end portion of a continuous mining machine of the boring type having a mobile base or main frame 10 having a cutter frame 11 supported thereon and extending in advance thereof, and mounted on the main frame 10, for vertical adjustment with respect thereto and for angular adjustment about axes extending transversely of said main frame, in a conventional manner, well known to those skilled in the art, so not herein shown or described further.

The cutter frame 11 has a plurality of laterally spaced longitudinally extending hollow drive shafts 12 journalled therein and projecting forwardly therefrom and forming support and drive means for rotatable boring heads 13. Only one drive shaft 12 and boring head 13 is shown herein, although any number of spaced boring heads may be provided.

As shown in FIGURE 1, the shaft 12 is journalled adjacent its rear end in the cutter frame 11 on a thrust bearing 15 and is journalled intermediate its ends in a hub 16 projecting from the cutter frame 11, in oppositely facing thrust bearings 17. Integrally formed spaced spur gears 18 splined or otherwise secured to the hollow shaft 12 within the gear casing 11 form a drive means for the shaft 12 and boring head 13 from a motor (not shown) which may be mounted on the main frame of the machine and has driving connection with the spur gears 18 through a suitable extensible geared drive connection (not shown) well known to those skilled in the art and not herein shown or described, since it forms no part of the present invention.

The machine also has an upper trimmer bar 19 mounted on the cutter frame 11 rearwardly of the boring heads 13 on laterally spaced hydraulic jacks 20. A lower trimmer bar 21 is also mounted on the cutter frame 11 in depending relation with respect thereto on suitable hydraulic jacks (not shown). A trimmer cutter chain 22 is guided for movement along the upper and lower trimmer bars 19 and 21, respectively, for trimming the cusps depending from the mine roof and extending upwardly from the mine floor and left between the boring heads 13. The cutter chain 22 is driven from a sprocket 23 keyed or otherwise secured to the hollow shaft 12.

As shown in FIGURES 1 and 2, each boring head 13 is formed integrally with the forward end portion of the hollow shaft 12 and has oppositely extending hollow radial arms 25, the hollow interior portions of which have communication with the hollow interior portion of the hollow shaft 12. The boring head 13 also has an annular pilot cutter support 26 mounted therein and projecting forwardly therefrom and having pilot cutter bits 27 projecting forwardly from the forward end thereof for making an annular pilot cut in the mine face. The boring arms 25 also have cutter supports 29 mounted thereon and projecting forwardly therefrom, having cutter bits 30 projecting from the forward faces thereof for cutting annular kerfs spaced radially outwardly from the pilot cutter 26.

Each hollow boring arm 25 has a generally cylindrical interior wall forming a support for a telescopic arm 31 having a closed outer end portion having an arcuate cutter support 33 mounted thereon and projecting forwardly therefrom. Cutter bits 35 are mounted in the advance face of the arcuate cutter support 33 for cutting an annular kerf spaced radially outwardly of the annular kerf cut by the cutter bits 30, carried by the arcuate cutter support 29.

The telescopic arm 31 has a hollow interior portion 36, generally cylindrical in form and longitudinally slotted to provide spaced fingers 37 having slidable interleaving engagement with similar spaced fingers 37 in the opposite telescopic arm 31, providing sufficient rigidity for cutting when in the outwardly extending positions shown in FIGURE 2, and to accommodate full retractable movement of said telescopic arms within the cutter arms 25.

A seal 39 engages the outer wall of the telescopic arm 31 and is retained to the end of the arm 25 by a retainer 40. The retainer 40 is secured to the end of the arm 25. The seal 39 is provided to seal the arm 25 from the ingress of dust and dirt.

Referring now in particular to the adjusting means for the telescopic arms 31, the two arms are adjustably moved together by operation of a slide 41 slidably carried within the hollow interior portion of the hollow shaft 12. The mechanism operated by the slide 41 for adjusting the two arms together is the same for each arm, so the adjusting mechanism for one arm only need herein be shown and described.

The arm 31 has spaced walls 43 extending transversely of the hollow interior portion 36 thereof, between which transverse walls fit a link 44, pivotally connected thereto as by a pivot pin 45. The link 44 has a bifurcated lower end portion 46 extending along opposite sides of a lever arm 47 of a bellcrank 49 and pivotally connected to said lever arm as by a pivot pin 50. The bellcrank 49 is pivotally connected within a recessed housing portion 51 of the arm 25 on a transverse pivot pin 53. The bellcrank 49 also has a second lever arm 54, shorter than the lever arm 47 and extending between the furcations of a bifurcated portion 55 of a link 56, and pivotally connected to said link as by a pivot pin 57. The end of the link opposite the pivot pin 57 extends within a recessed portion 59 of the slide 41 opening to the forward end of said slide and is pivotally connected to said slide by a transverse pivot pin 60 spaced radially outwardlly of the longitudinal axis of the hollow drive shaft 12.

It should here be noted with reference to FIGURES 1 and 2, that the lever arm 47 of the bellcrank 49 is considerably longer than the lever arm 54 of said bellcrank and that the two lever arms 47 and 54 are so arranged with respect to the axis of pivotal movement of the bellcrank 49 and the links 44 and 56 that angularity in movement of said links from the retracted position of the telescopic arm 31 shown in FIGURE 1, to the extended position of said telescopic arm shown in FIGURE 2 is a minimum. Thus, the cutting forces taken on the slide 41 through the links 44, the bellcranks 49 and the links 56 are exerted on the slide 41 endwise of said slide and converging toward the center of said slide in all positions of radial adjustment of the cutter arms 31 with respect to the arms 45.

With such a lever arrangement the forces on the slide are balanced and are taken substantially axially of the slide, enabling the slide to hold the arms 31 in their various desired positions of adjustment during the cutting operation and to assure freedom from binding between said slide and the hollow interior portion of the hollow shaft 12.

The slide 41 is moved axially along the hollow interior portion of the hollow shaft 12 by a piston rod 61 extending from a piston 62 within a double acting cylinder 63. The piston rod 61 has a disk 65 of larger diameter than said piston rod, secured to its outer end as by a retainer cap 66, threaded within the end of said piston rod and suitably locked thereto. Anti-friction thrust bearings 67 are carried within a recessed portion 68 of the slide 41 and abut opposite faces of the disk 65 and form a bearing support for said disk within the rear end portion of the slide 41, accommodating said slide to rotatably move with the shaft 12, while the cylinder 63 and piston rod 61 are stationary. A retainer 69 is secured to the inner end portion of the slide 41 and abuts the outer anti-friction bearing 67, and retains said bearings to the slide 41.

The piston 62 has an extension 70 extending in an opposite direction from the piston rod 61 through a head end 71 for the cylinder 63. The extension 70 is shown as extending within a housing 73 secured to the outer end of an end cap and retainer 74 for the thrust bearing 15. The extension 70 has rack teeth 75 formed therein and extending thereabout. The rack teeth 75 mesh with a pinion 76 herein shown as being formed integrally with the inner end of a shaft 77 journalled within the housing 73 on spaced anti-friction bearings 79.

The shaft 77 has a flexible drive shaft 80 extending in its opposite end from the pinion 76 and retained thereto as by a set screw 81. The flexible drive shaft 80 extends within a flexible housing 83 secured to an end cover 84 for the casing 73 at one end, and extending within and secured to an end cover 85 for a casing 86 at its opposite end. The flexible drive shaft extends within a drive member 87 journalled within the casing 86 on spaced anti-friction bearings 88. A set screw 89 is shown as securing the flexible drive shaft 80 to the drive member 87. The opposite end of the drive member 87 from the flexible drive shaft 83 has a threaded portion 90 extending therefrom and threaded within a plunger 91, slidably guided in the housing 86 for movement with respect thereto upon rotational movement of the drive member 87. The plunger 91 is suitably retained from rotational movement and has a pointer 92 projecting therefrom and registering with indicia on a scale 93. The indicia on the scale 93 may designate various cutting diameters of the arcuate cutters 33 and when the pointer 92 register therewith, indicates the position of adjustment and cutting diameter of the boring head.

It should here be understood that each boring head has an individual indicating means to enable all of the boring heads to be adjusted to cut to the same cutting diameter.

While I have herein shown and described one form in which my invention may be embodied, it may readily be understood that various variations and modifications in the invention may be attained without departing from the spirit and scope of the novel concepts thereof as defined by the claims appended hereto.

I claim as my invention:

1. In a boring arm assembly particularly adapted for continuous mining machines of the boring type, a hollow shaft having a plurality of boring arms extending radially therefrom, a telescopic arm telescopically mounted in each boring arm and having an arcuate cutter projecting forwardly therefrom, a slide axially movable along said hollow shaft, means for moving said slide along said shaft and holding said slide in position with respect to said shaft, lever means in association with each boring arm and pivotally mounted therein, and linkage connections between said slide and said lever means and said lever means and said boring arms, for adjusting said boring arms radially with respect to said shaft and for holding said boring arms in adjusted relation with respect to said shaft and transmitting the cutting loads axially of said slide.

2. In a boring arm assembly particularly adapted for continuous mining machines of the boring type, a frame, a hollow shaft rotatably mounted on said frame and having a plurality of boring arms projecting radially therefrom, a telescopic arm slidably mounted in each boring arm and having an arcuate cutter projecting forwardly therefrom, and means for adjustably moving said telescopic arms and cutters with respect to said boring arms comprising lever means transversely pivoted within each of said boring arms, a slide axially movable along said hollow shaft, power means for axially moving said slide along said shaft and holding said slide in position in said shaft, linkage means connecting said lever means to said telescopic arms, and other linkage means connecting said slides to said lever means, the angular relationship between said lever means and said linkage means being such that a greater part of the cutting loads are taken generally axially of said slide in all positions of adjustment of said telescopic arms with respect to said boring arms.

3. In a boring arm assembly particularly adapted for continuous mining machines of the boring type, a frame, a hollow shaft rotatably mounted in said frame and having a plurality of boring arms projecting radially therefrom, a telescopic arm slidably mounted in each boring arm and having an arcuate cutter projecting forwardly therefrom, and means for adjustably moving said telescopic arms and cutters with respect to said boring arms comprising a slide mounted in said hollow shaft for axial movement therealong, a translationally movable power member within said hollow shaft and having operative connection with said slide, individual lever means for each telescopic arm pivotally mounted in said boring arm for movement about an axis extending transversely of said shaft, a linkage connection from one lever arm of said lever means to said telescopic arm exerting an adjusting force on said telescopic arm axially thereof, and a linkage connection from a second lever arm of said lever means to said slide, said second linkage connections exerting balancing reacting forces on said slide on the end thereof generally axially of the axis of said slide.

4. In a boring arm assembly particularly adapted for continuous mining machines of the boring type, a frame, a hollow shaft rotatably mounted on said frame and having a plurality of boring arms projecting radially therefrom, a telescopic arm slidably mounted in each boring arm and having an arcuate cutter projecting forwardly therefrom, and means for adjustably moving said telescopic arms and cutters with respect to said boring arms and for holding said cutters in fixed relation with respect to said boring arms comprising a slide in said hollow shaft, a separate bellcrank for each telescopic arm pivotally mounted within an associated boring arm in radially spaced relation with respect to the axis of rotation thereof and in rearwardly spaced relation with respect to the associated telescopic arm, each bellcrank having a lever arm extending into a position adjacent the longitudinal axis of said telescopic arm and having a shorter lever arm extending towards said slide, a link connecting said first mentioned lever arm to said telescopic arm, a second link connecting said slide to said shorter lever arm for movement about a transverse axis closely adjacent, but spaced outwardly of the longitudinal axis of said slide, a translationally movable power member for moving said slide along said boring arm and holding said slide in position with respect thereto, said lever arms of said bellcranks being so related with respect to said telescopic arms and said slide, as to reduce the angularity in movement of said links to a minimum upon movement of said slide to adjustably move said telescopic arms from extreme retracted to extreme extended relations with respect to said boring head, and to exert balanced endwise thrust onto said slide in all position of adjustment of said telescopic arms with respect to said boring head.

5. In a boring arm assembly particularly adapted for continuous mining machines of the boring type, a hollow shaft having a plurality of boring arms extending radially therefrom, a telescopic arm telescopically mounted in each boring arm and having an arcuate cutter projecting forwardly therefrom, a slide axially movable along said hollow shaft, a translationally movable power member for moving said slide along said shaft, operative connections between said slide and said telescopic arms for radially adjusting said telescopic arms relative to said hollow shaft, said telescopic arms being mounted in said boring arms in axially aligned relation with respect to each other and being longitudinally slotted and having a slidable interleaving engagement with each other in the retracted positions of said telescopic arms.

6. In a boring arm assembly particularly adapted for continuous mining machines of the boring type, a frame, a hollow shaft rotatably mounted on said frame and having a plurality of boring arms projecting radially therefrom, a telescopic arm slidably mounted in each boring arm and having an arcuate cutter projecting forwardly therefrom, and means for adjustably moving said telescopic arms and cutters with respect to said boring arms comprising a hydraulic cylinder and piston mounted within said hollow shaft, a slide slidably movable along said hollow shaft, a piston rod connected with said piston and extending from said cylinder and having operative connection with said slide for moving said slide along said hollow shaft, a bellcrank in association with each telescopic arm, said bellcranks being pivotally mounted within said boring arms for movement about axes extending transversely of the axis of rotation of said boring arms and spaced radially outwardly therefrom and rearwardly of the associated telescopic arms, said bellcranks each having a first lever arm extending within the margins of the associated telescopic arm to a position adjacent the longitudinal center thereof, a link pivotally connecting said lever arm with said telescopic arm and extending generally along the longitudinal axis of said telescopic arm when said arm is in a retracted position, said bellcranks also having a second lever arm shorter than said first mentioned lever arm and extending within said hollow shaft toward said slide, a link pivotally connected between each second lever arm and said slide in radially spaced relation with respect to the longitudinal axis of said slide, the relationship between said lever arms of said bellcranks and said links and telescopic arms and slide being such as to reduce the angularity in movement of said links to a minimum in all positions of radial adjustment of said telescopic arms, and to exert balanced substantially endwise thrusts on said slide on opposite sides of the center thereof in all positions of adjustment of said telescopic arms with respect to said boring arms.

7. In a boring arm assembly particularly adapted for continuous mining machines of the boring type, a frame, a hollow shaft rotatably mounted on said frame and having a plurality of boring arms projecting radially therefrom, a telescopic arm slidably mounted in each boring arm and having an arcuate cutter projecting forwardly therefrom, and means for adjustably moving said telescopic arms and cutters with respect to said boring arms comprising a hydraulic cylinder and piston mounted within said hollow shaft, a slide slidably movable along said hollow shaft, a piston rod connected with said piston and extending from said cylinder and having operative connection with said slide for moving said slide along said hollow shaft, a bellcrank in association with each telescopic arm, said bellcranks being pivotally mounted within said boring arms for movement about axes extending transversely of the axis of rotation of said boring arms and spaced radially outwardly therefrom and rearwardly of the associated telescopic arms, said bellcranks each having a first lever arm extending within the margins of the associated telescopic arm to a position adjacent the longitudinal center thereof, a link pivotally connecting said lever arm with said telescopic arm and extending generally along the longitudinal axis of said telescopic arm when said arm is in a retracted position, said bellcranks each having a second lever arm shorter than said first mentioned lever arm and extending within said hollow shaft toward said slide, a link pivotally connected between each second lever arm and said slide in radially spaced relation with respect to the longitudinal axis of said slide, and said telescopic arms being axially aligned and longitudinally slotted and having slidable interleaving engagement with each other in the retracted positions of said telescopic arms with respect to said boring arms.

References Cited in the file of this patent
UNITED STATES PATENTS

| | | |
|---|---|---|
| 2,694,998 | Snow | Nov. 23, 1954 |
| 2,707,626 | Cartlidge | May 3, 1955 |
| 2,953,362 | Massy et al. | Sept. 20, 1960 |